United States Patent
Takatsuka

(10) Patent No.: US 7,539,567 B2
(45) Date of Patent: May 26, 2009

(54) ELECTRIC POWER STEERING CONTROL APPARATUS

(75) Inventor: Yuji Takatsuka, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 461 days.

(21) Appl. No.: 11/377,343

(22) Filed: Mar. 17, 2006

(65) Prior Publication Data
US 2007/0073462 A1    Mar. 29, 2007

(30) Foreign Application Priority Data
Sep. 26, 2005  (JP)  ............... 2005-277850

(51) Int. Cl.
  *B60T 11/00*  (2006.01)
  *B62D 3/00*   (2006.01)
  *B62D 11/24*  (2006.01)
(52) U.S. Cl. .............. 701/41; 180/6.24; 180/443; 188/350
(58) Field of Classification Search ............. None
See application file for complete search history.

(56) References Cited

U.S. PATENT DOCUMENTS

| | | | |
|---|---|---|---|
| 6,332,506 B1 * | 12/2001 | Kifuku | 180/443 |
| 6,708,098 B2 * | 3/2004 | Matsumoto et al. | 701/70 |
| 6,859,713 B2 * | 2/2005 | Pallot | 701/72 |
| 6,879,890 B2 * | 4/2005 | Matsumoto et al. | 701/23 |
| 7,089,101 B2 * | 8/2006 | Fischer et al. | 701/41 |
| 7,165,644 B2 * | 1/2007 | Offerle et al. | 180/244 |
| 7,236,884 B2 * | 6/2007 | Matsumoto et al. | 701/300 |
| 7,318,629 B1 * | 1/2008 | Sun et al. | 303/146 |
| 7,392,121 B2 * | 6/2008 | Arima et al. | 701/41 |
| 2004/0140148 A1 * | 7/2004 | Nishizaki et al. | 180/443 |
| 2007/0051547 A1 * | 3/2007 | Fischer et al. | 180/204 |
| 2007/0073462 A1 * | 3/2007 | Takatsuka | 701/41 |
| 2007/0288143 A1 * | 12/2007 | Arima et al. | 701/41 |
| 2007/0288144 A1 * | 12/2007 | Arima et al. | 701/41 |

FOREIGN PATENT DOCUMENTS

| | | | |
|---|---|---|---|
| EP | 1867557 A2 * | 12/2007 | |
| JP | 63-181686 A | 7/1988 | |
| JP | 03200415 A * | 9/1991 | |
| JP | 05-301578 A | 11/1993 | |
| JP | 05-301578 A * | 11/1993 | |
| JP | 2007069833 A * | 3/2007 | |

OTHER PUBLICATIONS

Linear Summation of Torque Produced by Selective Activation of Two Motor Fascicles; Tarler, M.D.; Mortimer, J.T.; Neural Systems and Rehabilitation Engineering, IEEE Transactions on; vol. 15, Issue 1, Mar. 2007 pp. 104-110; Digital Object Identifier 10.1109/TNSRE.2007.891377.*

(Continued)

*Primary Examiner*—Cuong H Nguyen
(74) *Attorney, Agent, or Firm*—Sughrue Mion, PLLC

(57) ABSTRACT

An electric power steering control includes a torque sensor for detecting steering torque as torque information, a motor for generating assist torque, a calculation section for calculating a motor current command value based on the torque information at each predetermined sampling period, and a motor current control section for driving and controlling the motor based on the motor current command value. The calculation section includes a first target current calculation section for calculating a first target current based on the torque information detected in a time series manner at a first control period corresponding to the sampling period, and a second target current calculation section for calculating a second target current based on the first target current at a second control period shorter than the first control period. The motor current control section controls the motor by using the second target current as the motor current command value.

5 Claims, 9 Drawing Sheets

OTHER PUBLICATIONS

A feedforward neural network for the automatic control of a four-wheel-steering passenger car; Rezeka, S.F.; American Control Conference, 1995. Proceedings of the; vol. 3, Jun. 21-23, 1995 pp. 2292-2296 vol. 3.*

Stable PD and Internal Force Control of Omnidirectional Wheeled Mobile Manipulators; Dong Xu; Dongbin Zhao; Jianqiang Yi; Xuyue Deng; Guosheng Yang; Mechatronics and Automation, 2007. ICMA 2007. International Conference on; Aug. 5-8, 2007 pp. 1362-1367; Digital Object Identifier 10.1109/ICMA.2007.4303748.*

X. Y. Deng, D. B. Zhao, J. Q. Yi, J. T. Wen, "Motion and squeeze force control for omnidirectional wheeled mobile robots," Proceedings of the 2006 American Control Conference, pp. 5608-5613, 2006.*

* cited by examiner

ELECTRIC POWER STEERING CONTROL APPARATUS

BACKGROUND OF THE INVENTION

1. Field of the Invention

The present invention relates to an electric power steering control apparatus that serves to provide an assist force generated by the rotational force of an electric motor (hereinafter referred to simply as a "motor") to a steering system (a steering wheel) of a vehicle, and more particularly, it relates to a new technique for reducing the driving control sound of the motor.

2. Description of the Related Art

In the past, there have been proposed a variety of electric power steering control apparatuses in which the steering torque of a steering system (a steering wheel) is detected and an assist torque to a steering system is generated by a motor by controlling the drive current of the motor in accordance with the detected value of the steering torque.

In case of such a kind of electric power steering control apparatus, it is known that a control sound is generated from the motor upon variation of a motor current command value.

In general, as a cause for the control sound generated from the motor, there can be considered vibration due to time harmonic of a power supply, vibration due to an unbalance of a rotor of the motor, etc., and such a vibration component is amplified in particular by the unbalance of the motor to generate discordant or harsh noise offensive to the ear.

Accordingly, there have been proposed a variety of electric power steering control apparatuses that serve for the purpose of preventing control sounds from being generated from a motor (see, for example, a first patent document (Japanese patent application laid-open No. H5-301578)).

In a conventional apparatus as described in the first patent document, when a motor current command value is calculated which serves to supply a steering system with an assist torque corresponding to a steering torque applied to a steering wheel by a driver, a comparison is made between the current detected value and the last (one sampling before) detected value of steering torque detection signal sampled in a time series manner (in a period of 1 msec) so as to calculate an average value, which is then set as a motor current command value. As a result, the variation of the motor current command value is suppressed, and the variation of an actual motor current is also suppressed, thus preventing the generation of a control sound from the motor.

In the conventional electric power steering control apparatus, as described in the first patent document, upon calculation of the motor current command value, an average value is obtained between the current value and the last value (one sampling before) of the steering torque that are detected by a predetermined sampling period (1 msec). As a result, the actual motor current command value varies in a period of 1 msec, too, so the control sound of the motor will change at a frequency of 1 kHz.

However, since the diapason or frequency of 1 kHz is a high level frequency (loudness level) that is particularly felt as unusual noise to man, there has been a problem that when the variation of the motor current command value is large, the unusual noise of 1 kHz generated from the motor can not be suppressed to a satisfactory extent.

On the other hand, it can be considered that the processing period of the entire control (sampling period) is set shorter than 1 msec so that the variation of the motor current command value can be suppressed, and at the same time the control sound of the motor is shifted to the side of higher frequencies that man can not hear easily, thereby reducing the level of the unusual noise, but in this case, the calculation load of a CPU is increased due to an increase in the number of samplings, so there arises a problem that it is impossible to realize the control with the use of an inexpensive CPU, thus inviting an increase in cost.

SUMMARY OF THE INVENTION

Accordingly, the present invention is intended to solve the problems as referred to above, and has for its object to obtain an electric power steering control apparatus which is capable of reducing the generation of a control sound of a motor while decreasing the calculation load of a motor current control section (e.g., CPU) by setting only the control period of a final target current (a motor current command value) to a short one.

Bearing the above object in mind, according to the present invention, there is provided an electric power steering control apparatus for a vehicle which includes a steering system including a steering wheel; a torque sensor that detects steering torque applied to the steering system as torque information; a motor that generates assist torque for the steering system; a calculation section that calculates a motor current command value for the motor based on the torque information at each predetermined sampling period; and a motor current control section that drives and controls the motor based on the motor current command value. The calculation section includes: a first target current calculation section that calculates a first target current based on the torque information detected from the torque sensor in a time series manner at a first control period corresponding to the sampling period; and a second target current calculation section that calculates a second target current based on the first target current at a second control period that is shorter than the first control period. The motor current control section controls the motor by using the second target current as the motor current command value.

According to the present invention, by calculating the target current (motor current command value) in the second control period that is shorter than the first control period, without changing the first control period for the entire control (sampling period), it is possible not only to shift the control sound of the motor to the side of high frequencies that man can not hear easily, while suppressing an increase in the calculation load of the motor current control section (CPU) thereby to avoid an increase in cost, but also to reduce the generation level of unusual noise by decreasing the variation level of the target current.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described while referring to the accompanying drawings.

Embodiment 1

Figure 1:
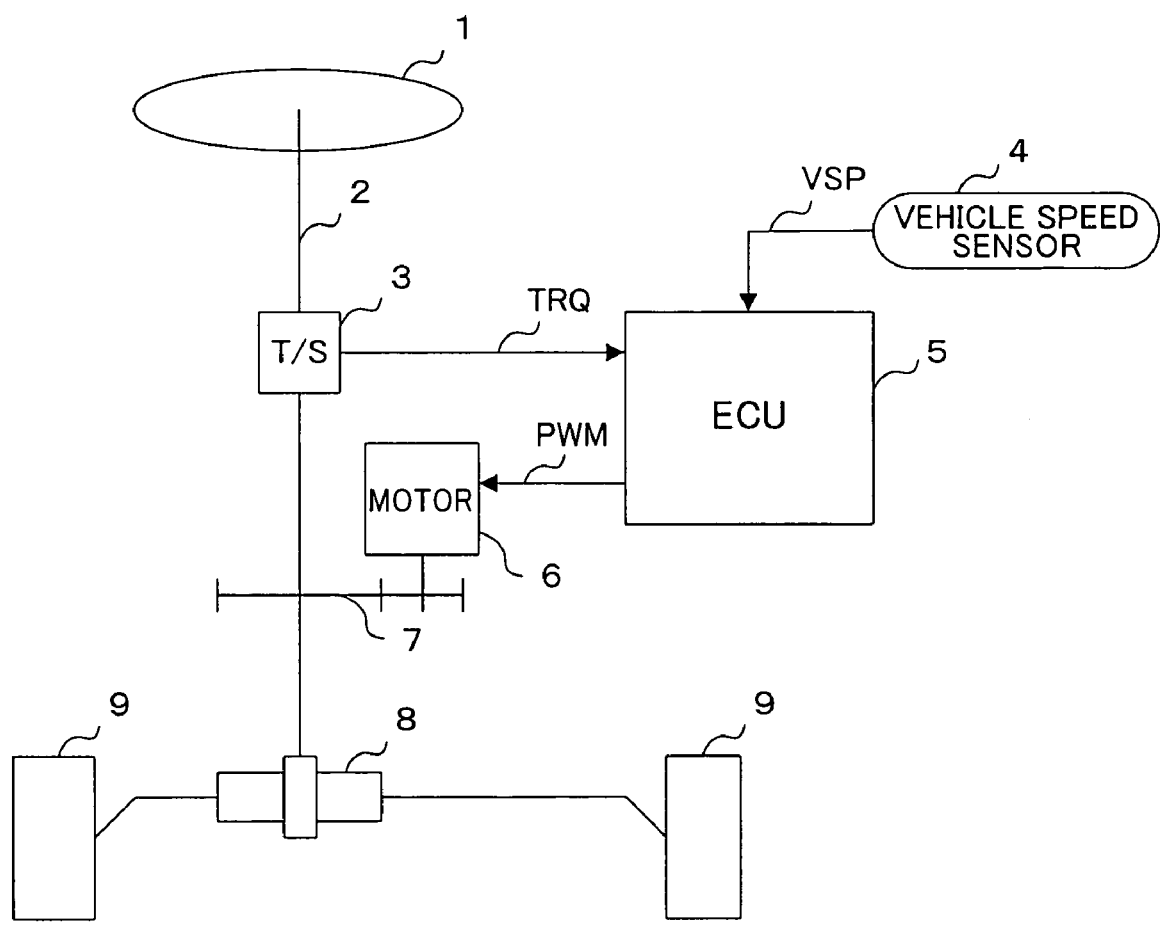
FIG. 1 is a block diagram schematically showing an electric power steering control apparatus according to a first through a third embodiment of the present invention.

FIG. 1 is a block diagram that schematically shows an electric power steering control apparatus according to a first embodiment of the present invention.

In FIG. 1, the steering wheel 1 of a vehicle in the form of a motor vehicle receives a manual steer rotational force (steering torque) applied thereto by a driver. A steering shaft 2 is formed integrally with the steering wheel 1 so as to be rotatable together with the steering wheel 1.

A torque sensor 3 outputs an electric signal corresponding to the steering torque applied to the steering wheel 1 as torque information TRQ.

A vehicle speed sensor 4 outputs an electric signal corresponding to the running speed of the motor vehicle as vehicle speed information VSP.

The control unit (hereinafter referred to as an "ECU") 5 includes a calculation section and a motor current control section for controlling a steering system, and it generates a driving control signal PWM to a motor 6 based on the torque information TRQ and the vehicle speed information VSP.

The motor 6 is operated in response to the driving control signal PWM from the ECU 5 to generate an assist torque in the steering system that includes the steering wheel 1 and the steering shaft 2.

A speed reducer 7 serves to reduce the assist torque output from the motor 6 and to transmit it to the steering shaft 2.

The steering torque and the assist torque impressed to the steering shaft 2 are transmitted to right and left front wheels 9 of the vehicle through a rack and pinion gear 8.

Next, reference will be made to the internal configuration of the ECU 5 while referring to a block diagram in FIG. 2.

Figure 2:
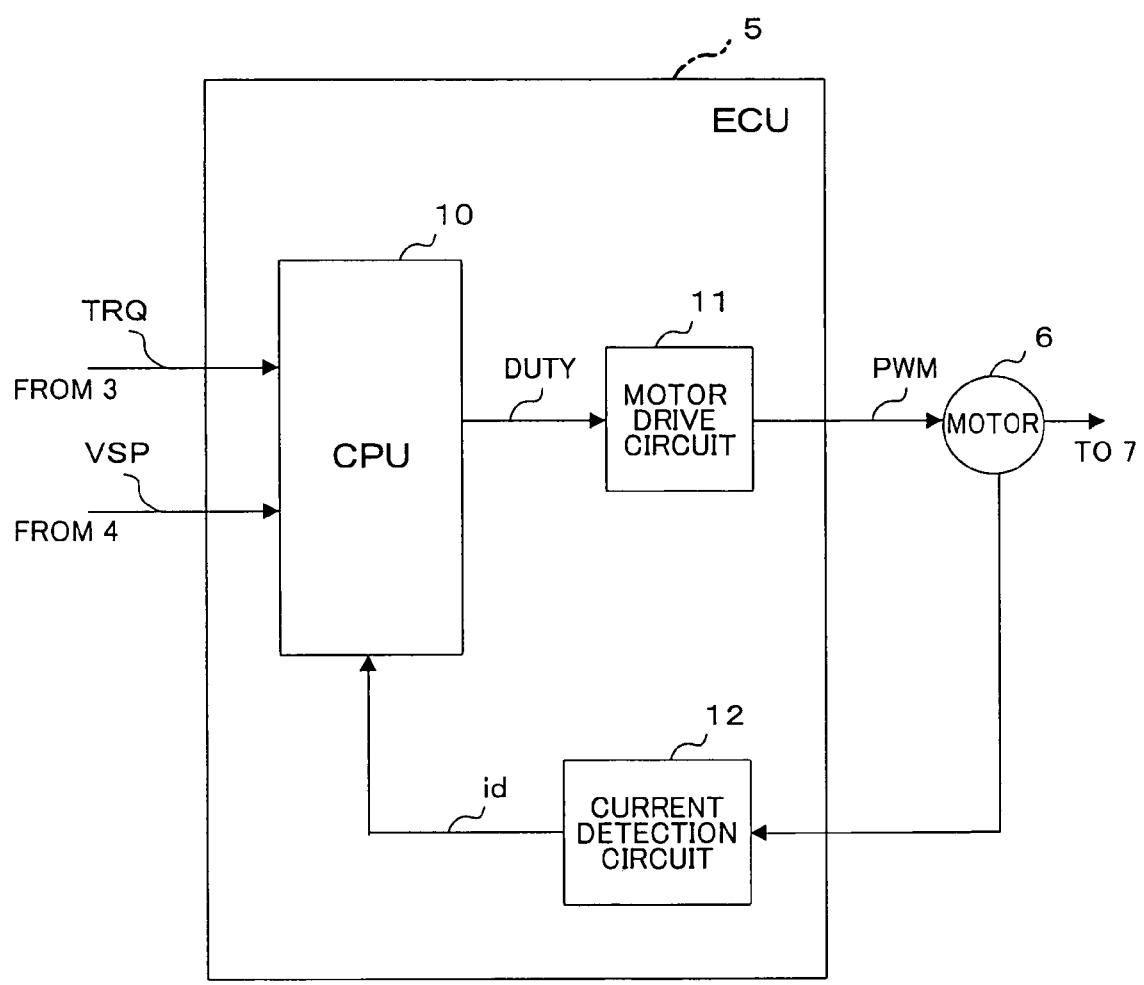
FIG. 2 is a block diagram showing the interior configuration of an ECU according to the first through third embodiments of the present invention.

In FIG. 2, the same or like parts or elements as those described above (see FIG. 1) are identified by the same symbols while omitting a detailed description thereof.

The ECU 5 is provided with a CPU (microcomputer) 10, a motor drive circuit 11, and a current detection circuit 12 that detects motor current information id supplied to the motor 6.

The motor drive circuit 11 outputs a driving control signal PWM comprising a PWM signal to the motor 6 based on a duty ratio DUTY corresponding to a motor current command value from the CPU 10.

Next, specific reference will be made to the processing function of the CPU 10 in the ECU 5 while referring to FIGS. 3 through 6.

Figure 3:
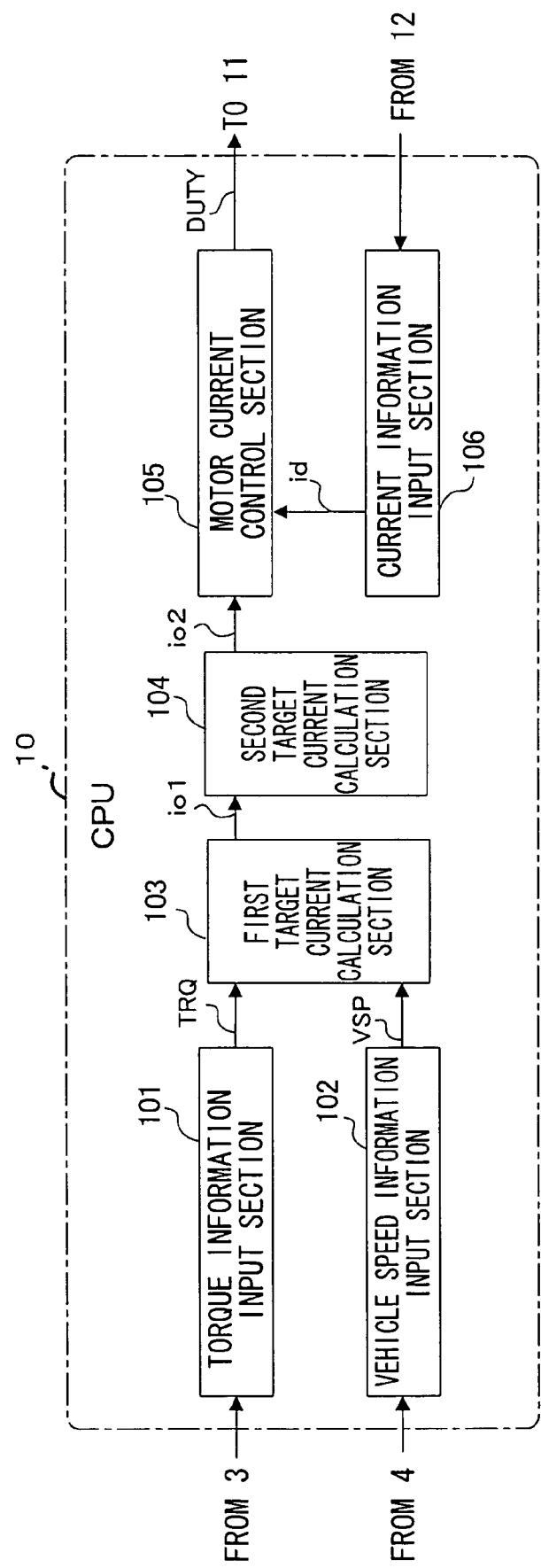
FIG. 3 is a perspective view showing an example of a specific configuration of a CPU according to the first through third embodiments of the present invention.
Figure 4:
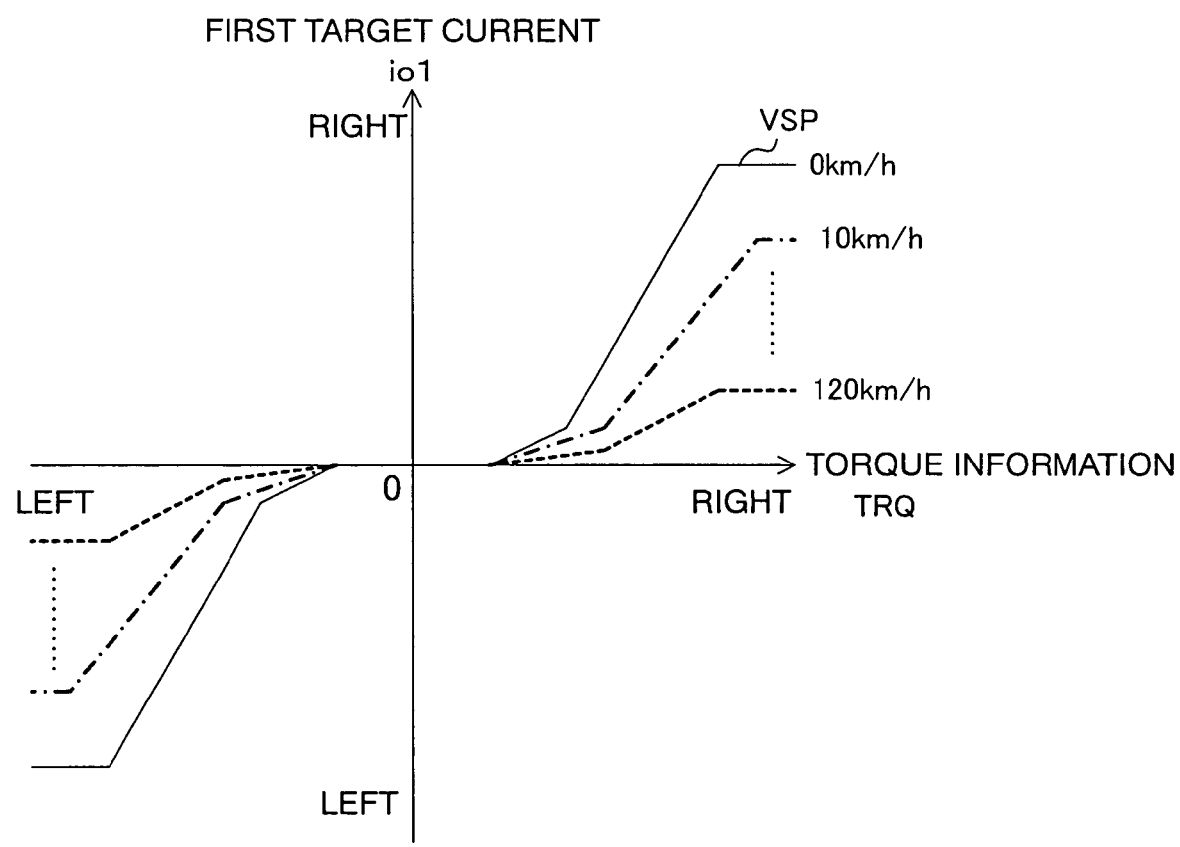
FIG. 4 is an explanatory view illustrating the calculation characteristic of a first target current calculation section according to the first through third embodiments of the present invention.
Figure 5:
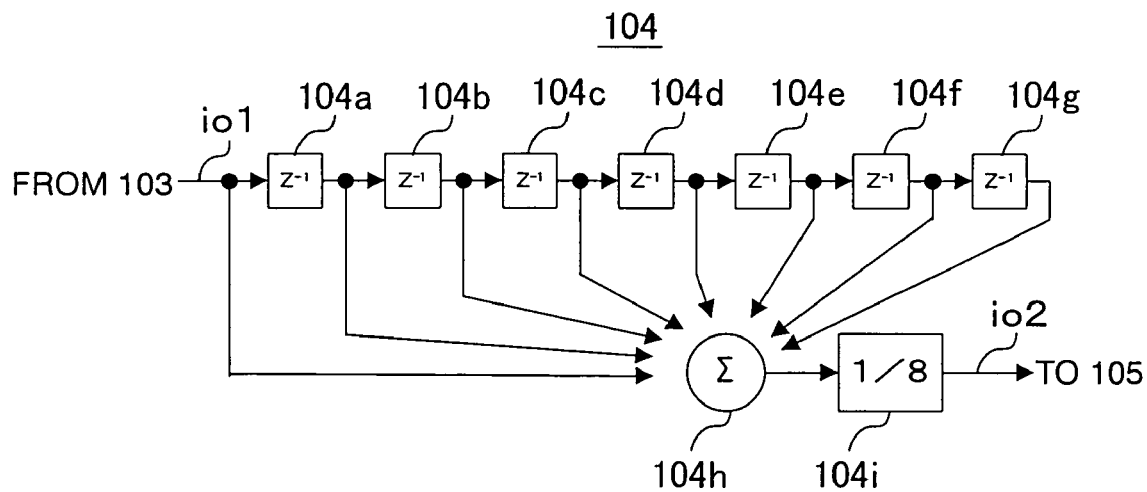
FIG. 5 is a functional block diagram conceptually showing a moving average processing section applied to a second target current calculation section according to the first embodiment of the present invention.
Figure 6:
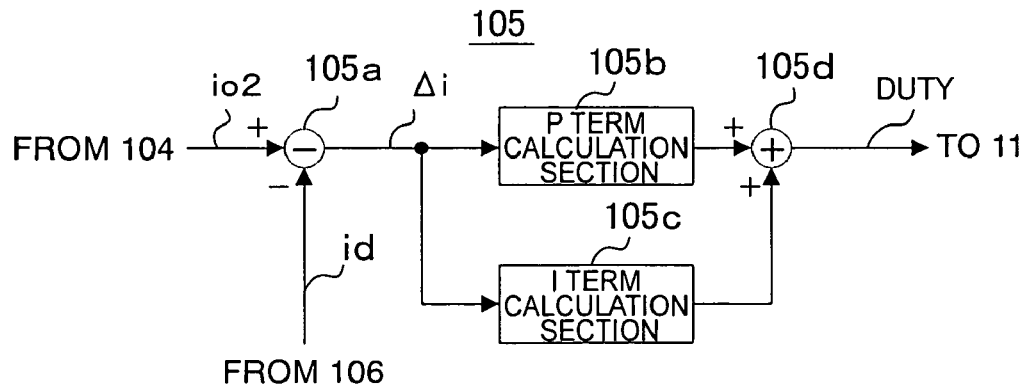
FIG. 6 is a functional block diagram conceptually showing a PI processing section applied to a motor current control section according to the first through third embodiments of the present invention.

FIG. 3 is a functional block diagram that shows an example of the specific configuration of the CPU 10 according to the first embodiment of the present invention, and FIG. 4 is an explanatory view that shows a calculation characteristic according to a first target current calculation section 103 in FIG. 3. FIG. 5 is a functional block diagram that conceptually shows a moving average processing section according to a second target current calculation section 104 in FIG. 3, and FIG. 6 is a functional block diagram that conceptually shows a PI processing section according to a motor current control section 105 in FIG. 3.

In FIG. 3, the CPU 10 includes a torque information input section 101, a vehicle speed information input section 102, the first target current calculation section 103, the second target current calculation section 104, the motor current control section 105, and a current information input section 106.

The torque information input section 101 inputs torque information TRQ from the torque sensor 3 to the first target current calculation section 103.

The vehicle speed information input section 102 inputs the vehicle speed information VSP from the vehicle speed sensor 4 to the first target current calculation section 103.

The first target current calculation section 103 calculates a first target current io1 based on the calculation characteristic shown in FIG. 4 by using the torque information TRQ and the vehicle speed information VSP.

In FIG. 4, the first target current io1 is decided by map data based on the torque information TRQ (the axis of abscissa) and the vehicle speed information VSP (a solid line, an alternate long and short dash line, a broken line, . . . ).

Also, the second target current calculation section 104 in FIG. 3 calculates a second target current io2 in the form of a motor current command value by executing the moving average processing as shown in FIG. 5 on the first target current io1.

In FIG. 5, the second target current calculation section 104 is provided with a moving average processing section that comprises a plurality of memories 104a through 104g, a sum total calculation unit 104h, and a divider 104i that performs a ⅛ division process.

The memories 104a through 104g are arranged in a serial manner so that the time series data values of the first target current io1 input from the first target current calculation section 103 at a predetermined sampling period (a first control period T1) are stored in the memories 104a through 104g in a sequential or successive manner. In this case, 8 sampled values of the first target current io1 from the preceding 7 samplings to the current sampling are acquired in a time series manner.

The sum total calculation unit 104h adds up all of the current sampling value and the individual sampled values in the memories 104a through 104g, respectively, and the divider 104i calculates the second target current io2 as a motor current command value by dividing the sum total value from the sum total calculation unit 104h by a value of "8".

At this time, the arithmetic calculation processing according to the second target current calculation section 104 is executed at a second control period T2 (e.g., T1/8=0.125 msec) that is shorter than the first control period T1 (e.g., 1 msec).

In addition, the current information input section 106 in FIG. 3 inputs the motor current information id from the current detection circuit 12 to the motor current control section 105.

The motor current control section 105 calculates a duty ratio DUTY for PWM driving the motor 6 based on the second target current io2 and the motor current information id (detected value) by executing general PI calculation processing as shown in FIG. 6.

In FIG. 6, the motor current control section 105 is provided with a PI calculation processing section that comprises a subtracter 105a, a P term calculation section 105b, an I term calculation section 105c, and an adder 105d.

The subtracter 105a calculates a current deviation Δi between the second target current io2 from the second target current calculation section 104 and the motor current information id from the current information input section 106.

The P term calculation section 105b executes P term (proportional) calculation processing based on the current deviation Δi, and the I term calculation section 105c executes I term (integration) calculation processing based on the current deviation Δi.

The adder 105d adds the respective calculation results of the P term calculation section 105b and the I term calculation section 105 to each other, and inputs the result thus obtained to the motor drive circuit 11 as a duty ratio DUTY for PWM driving.

Hereinafter, the motor drive circuit 11 PWM drives the motor 6 by means of the driving control signal PWM with the duty ratio DUTY, as previously stated.

In FIG. 3, the torque information input section 101, the vehicle speed information input section 102, and the first target current calculation section 103 execute input processing and calculation processing at the first control period T1 (=1 msec).

Also, the second target current calculation section 104, the motor current control section 105 and the current information input section 106 execute input processing, calculation processing and control processing at the second control period T2 (=0.125 ms).

Now, reference will be made to the specific operation of the CPU 10 according to the first embodiment of the present invention while referring to flow charts in FIGS. 7 and 8 together with FIGS. 1 through 6.

Figure 7:
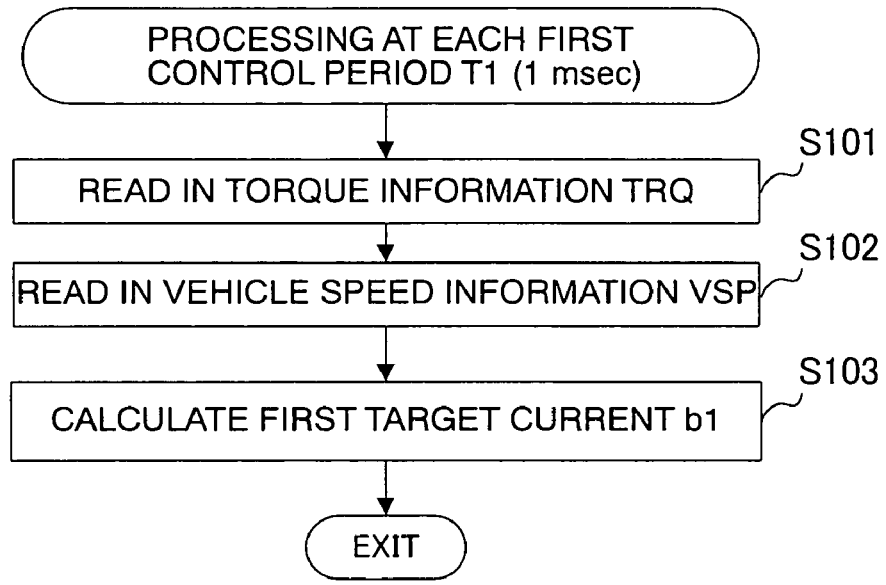
FIG. 7 is a flow chart illustrating a processing routine executed at each first control period by the CPU according to the first through third embodiments of the present invention.

FIG. 7 illustrates a processing routine related to the first target current calculation section 103, which is executed at each first control period T1 (1 msec) corresponding to the sampling period.

Figure 8:
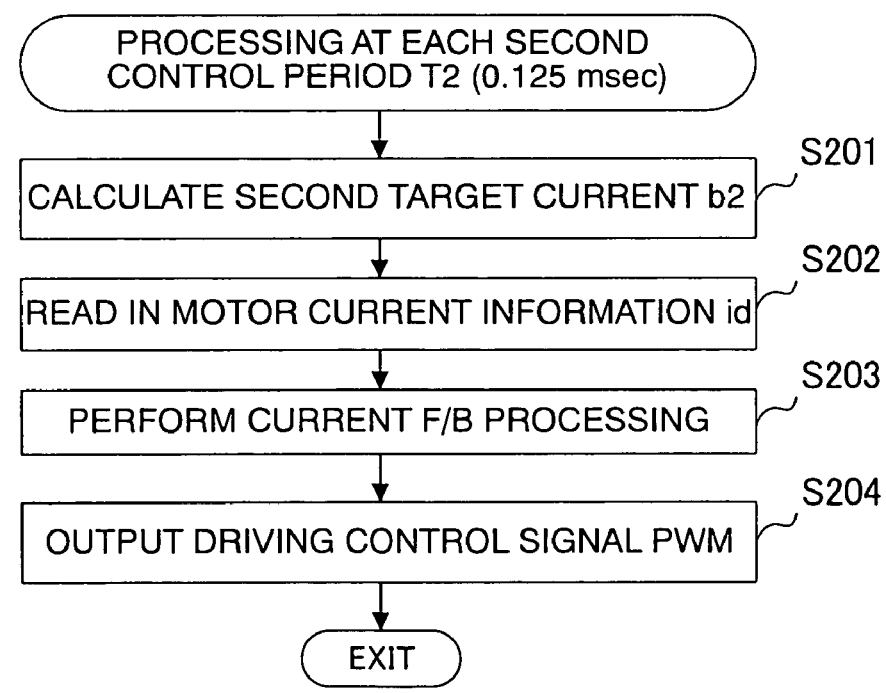
FIG. 8 is a flow chart illustrating a processing routine executed at each second control period by the CPU ,according to the first through third embodiments of the present invention.

FIG. 8 illustrates a processing routine related to the second target current calculation section 104 and the motor current control section 105, which is executed at each second control period T2 (0.125 msec) that is shorter than the first control period T1.

In FIG. 7, first of all, the first target current calculation section 103 in the CPU 10 reads in the torque information TRQ from the torque sensor 3 through the torque information input section 101 (step S101), and also reads in the torque information TRQ from the vehicle speed sensor 4 through the vehicle speed information input section 102 (step S102).

Subsequently, the first target current calculation section 103 calculates the first target current io1 from the torque information TRQ acquired in step S101 and the vehicle speed information VSP acquired in step S102 in accordance with the calculation characteristic shown in FIG. 4 (step S103), and thereafter the processing routine of FIG. 7 is exited.

Hereinafter, the processes in steps S101 through S103 are carried out in a repeated manner at each first control period T1 (1 msec).

On the other hand, in FIG. 8, the second target current calculation section 104 first calculates the second target current io2 by executing the moving average processing (see FIG. 5) on the first target current io1 (step S201).

Also, the motor current control section 105 reads in the motor current information id through the current information input section 106 (step S202).

Subsequently, the motor current control section 105 executes the PI calculation processing shown in FIG. 6 by using the second target current io2 (the motor current command value) calculated in step S201 and the motor current information id acquired in step S202 (step S203), calculates the duty ratio DUTY and inputs it to the motor drive circuit 11.

Finally, the motor drive circuit 11 outputs a driving control signal PWM to the motor 6 according to the duty ratio DUTY calculated in step S203, whereby the motor 6 is driven to operate (step S204).

Hereinafter, the processes in steps S201 through S204 are carried out in a repeated manner at each second control period T2 (0.125 msec).

As described above, according to the first embodiment of the present invention, the electric power steering control apparatus includes the torque sensor 3 that detects a steering torque (torque information TRQ) applied to the steering system (the steering wheel 1 and the steering shaft 2), the motor 6 that outputs an assist torque corresponding to the torque information TRQ to the steering system, the calculation section that calculates a motor current command value to the motor 6 at each predetermined sampling period based on the torque information TRQ, and the motor current control section 105 that drives and controls the motor 6 based on the motor current command value.

In addition, the calculation section includes the first and second target current calculation sections 103, 104, wherein the first target current calculation section 103 calculates, based on the detected signal value (torque information TRQ) input from the torque sensor 3 in a time series manner, the first target current io1 at the first control period T1 (1 msec) corresponding to the sampling period, and the second target current calculation section 104 calculates the second target current io2 based on the first target current io1 at the second control period T2 (e.g., 0.125 msec) that is shorter than the first control period T1, whereby the motor current control section 105 controls the motor 6 by using the second target current io2 as the motor current command value.

That is, the calculation processing of the second calculation section 104 based on the second control period T2 is carried out from the calculation result of the first calculation section 103 based on the first control period T1, whereby the update period of the final motor current command value (second target current io2) is shortened, and the motor current control section 10 controls the motor 6 based on the second target current io2.

Thus, by setting the second control period T2 for the second target current io2 (the motor current command value) shorter than the first control period T1 for the first target current io1, the control sound of the motor 6 can be shifted to the side of high frequencies that man can not hear easily, and the level of unusual noise contained in the control sound of the motor 6 can be reduced.

Moreover, in this case, the moving average processing section (see FIG. 5) is used as a specific section for calculating the second target current io2, as a result of which the variation of the motor current command value can be suppressed, thereby making it possible to reduce the generation of the control sound from the motor 6.

Further, only the calculation step S201 in FIG. 8 is added without the need to change the first control period T1 (1 msec) for execution of the processing routine of FIG. 7 (i.e., with the first control period T1 remaining set to a known sampling period). As a consequence, the unusual noise contained in the control sound of the motor 6 can be reduced without increasing the calculation load of the CPU 10 to any substantial extent.

Although an example has been taken herein for the case in which the second control period T2 is set so as to make the frequency of the control sound (unusual noise) of the motor 6 become 8 kHz, the second control period T2 need only be set in a frequency band (e.g., 4 kHz or above) that is greater than a frequency at which the human audible sound becomes a maximum level (1 kHz to 3 kHz), and it is needless to say that operational effects equivalent to those as stated above can be attained, too.

Now, reference will be made in more detail to the above-mentioned operational effects according to the first embodiment of the present invention while referring to FIG. 9.

Figure 9:
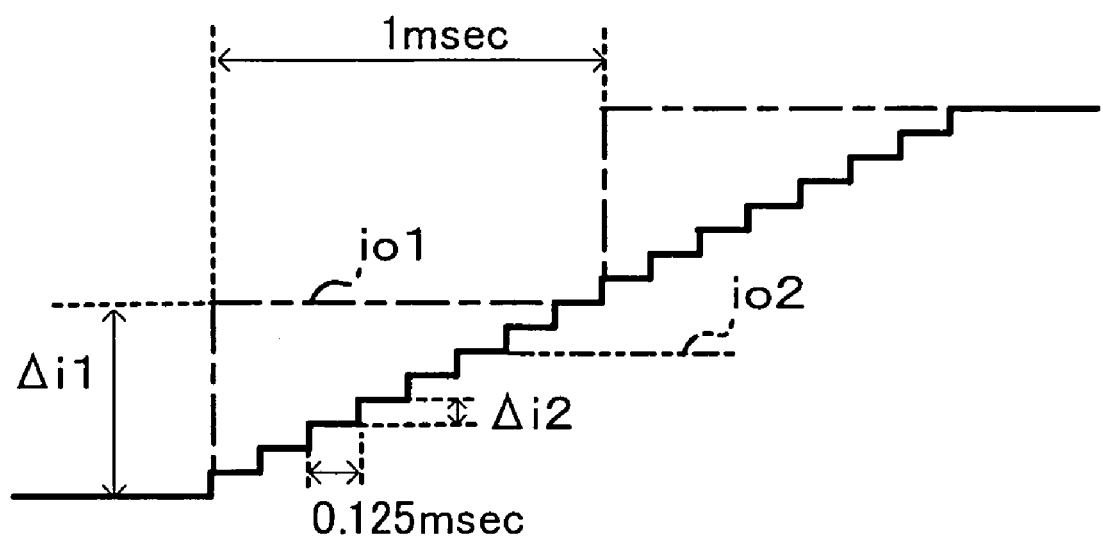
FIG. 9 is an explanatory view illustrating the result of calculation of the second target current according to the first embodiment of the present invention.

FIG. 9 shows in a timing chart the change over time of the motor current command value (in case of increasing), in which the axis of abscissa represents time and the axis of ordinate represents the levels of the first target current io1 and the second target current io2.

As is clear from FIG. 9, the amount of change Δi2 of each second control period T2 (0.125 msec) of the second target current io2 is reduced to ⅛ as compared with the amount of change Δi1 of each first control period T1 (1 msec) of the first target current io1, so the level of the unusual noise contained in the control sound of the motor 6 is also reduced to ⅛.

In addition, the frequency of the unusual noise contained in the control sound of the motor 6 changes from 1 kHz (1/1 msec) to 8 kHz (1/0.125 msec) that man can not hear easily. As a result, the generation of the unusual noise can be reduced.

Embodiment 2

Although in the above-mentioned first embodiment, the moving average processing section is used as the second target current calculation section 104, a low-pass filter may instead be employed.

Hereinafter, reference will be made to an electric power steering control apparatus using a low-pass filter according to a second embodiment of the present invention while referring to FIGS. 10 and 11 together with FIGS. 1 through 4 and FIGS. 6 through 8.

Figure 10:
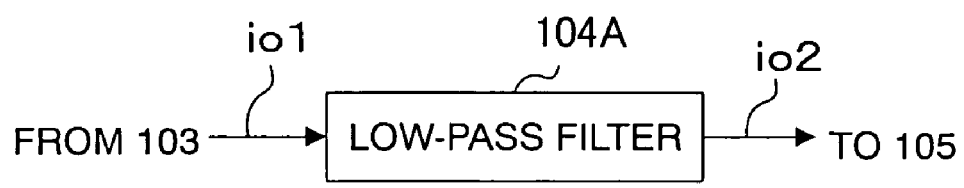
FIG. 10 is a functional block diagram showing a low pass filter applied to the second target current calculation section according to the second embodiment of the present invention.

FIG. 10 is a functional block diagram that shows a second target current calculation section according to the second embodiment of the present invention, in which the configuration not illustrated herein is similar to the above-mentioned one (see FIGS. 1 through 3).

Figure 11:
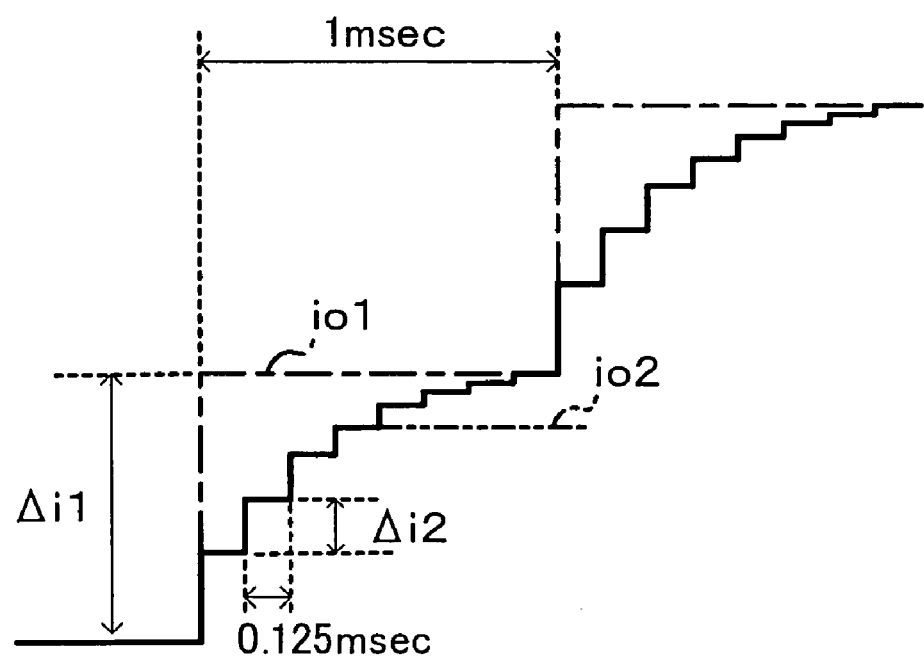
FIG. 11 is an explanatory view showing the result of calculation of the second target current calculated according to the second embodiment of the present invention.

FIG. 11 is an explanatory view that shows the second target current io2 calculated by the low-pass filter processing of FIG. 10 in association with the first target current io1.

Here, note that the overall configuration of the electric power steering control apparatus in this case is as shown in FIGS. 1 through 3. In addition, the processing in the CPU 10 is illustrated in FIGS. 7 and 8, in which the content of processing in step S201 in FIG. 8 is only different from the above-mentioned.

In FIG. 10, the second target current calculation section comprises a low-pass filter 104A which calculates the second target current io2 from the first target current io1 by executing low-pass filter processing.

As a result, the second target current io2 with the amount or rate of change Δi2 thereof being reduced is obtained at each second control period T2 (0.125 msec), as shown in FIG. 11.

That is, according to the second embodiment of the present invention, the frequency of unusual noise contained in the control sound of the motor 6 changes from 1 kHz into 8 kHz, and the amount of change Δi2 (step width) also becomes smaller, so the reduction of the unusual noise can be made.

Accordingly, similarly as stated above, the variation of the motor current command value can be suppressed, thereby making it possible to reduce the generation of a control sound from the motor 6.

Since in this case, too, the step S201 in FIG. 8 is only added without changing the period of execution of FIG. 7 (1 msec), unusual noise can be reduced without increasing the calculation load of the CPU 10 to any substantial extent.

Embodiment 3

Although in the above-mentioned second embodiment, the low-pass filter 104A is used as the second target current calculation section, an interpolation processing section may instead be employed which executes interpolation processing on first target currents io11, io12 that are calculated in succession.

Hereinafter, reference will be made to an electric power steering control apparatus using an interpolation processing section according to a third embodiment of the present invention while referring to FIGS. 12 and 13 together with FIGS. 1 through 4 and FIGS. 6 through 8.

Figure 12:
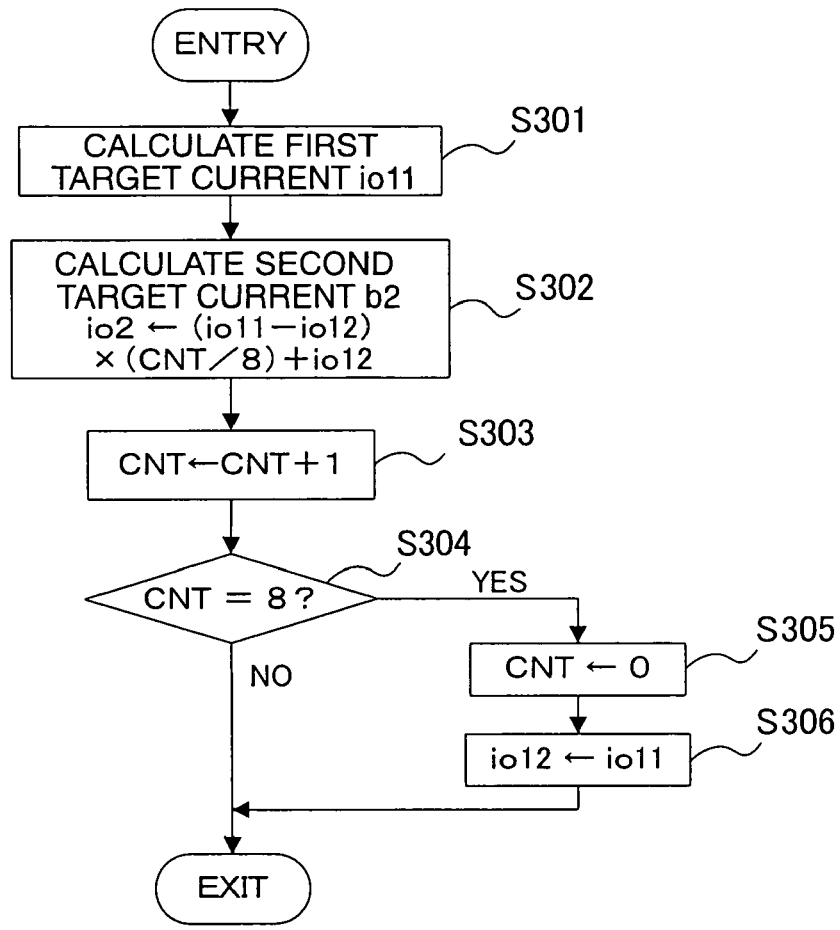
FIG. 12 is a flow chart illustrating an interpolation processing routine of the second target current calculation section according to the third embodiment of the present invention.

FIG. 12 is a flow chart that illustrates an interpolation processing routine of a second target current calculation section 104 according to the third embodiment of the present invention.

Figure 13:
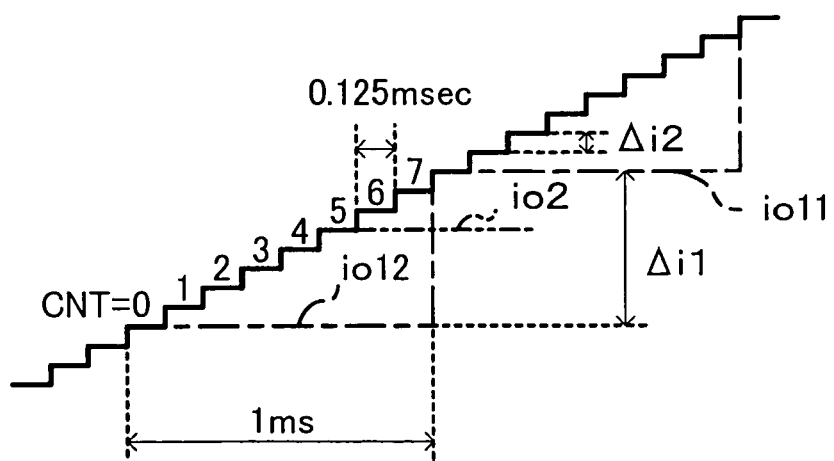
FIG. 13 is an explanatory view showing the result of calculation of the second target current carried out by the third embodiment of the present invention.

FIG. 13 is an explanatory view that shows a second target current io2 calculated by the interpolation processing of FIG. 12 in association with the first target currents io11, io12.

Here, note that the overall configuration of the electric power steering control apparatus in this case is as shown in FIGS. 1 through 3. Also, a processing routine of a CPU 10 is illustrated in FIGS. 7 and 8, in which the content of processing in step S201 in FIG. 8 is only different from the above-mentioned.

In FIG. 12, the first target current io1 is shown as distinguished by the current value io11 and the last value io12.

In addition, it is assumed that the last value io12 of the first target current io1 is set to "0" as an initial value thereof.

Moreover, in order to detect when the second control period T2 (0.125 msec), which was obtained by dividing the first control period T1 (the sampling period: 1 msec) into 8 parts, has reached 1 msec, the value CNT of a counter is set to "0" as its initial value.

In FIG. 12, first of all, the first target current calculation section 103 calculates the current value io11 of the first target current io1 (step S301).

Subsequently, the second target current calculation section 104 calculates the second target current io2 by using the current value io11 of the first target current io1 and the last value io12, as shown by the following expression (1) (step S302).

$$io2=(io11-io12)\times CNT/8+io12 \tag{1}$$

Then, the value CNT of the counter is incremented (step S303), and it is determined whether the value CNT of the counter has reached "8" (step S304).

When it is determined as CNT<8 in step S304 (that is, NO), a period of time of 1 msec has not yet elapsed from the start of calculation of the second target current io2, so the processing routine of FIG. 12 is exited at once.

On the other hand, when it is determined CNT=8 in step S304 (that is, YES), the value CNT of the counter is cleared to "0" (step S305), and the current value io11 is updated and registered as the last value io12 (step S306), while exiting the processing routine of FIG. 12.

The updated last value io12 of the first target current io1 is used for calculation of the next value of the second target current io2 (step S302).

As described above, according to the third embodiment of the present invention, by calculating the second target current io2 through an interpolation calculation between the current value io11 and the last value io12 of the first target current io1, the second target current io2 in the form of the amount of change $\Delta i2$, which was obtained by dividing the amount of change $\Delta i1$ of the first target current io1 into 8 parts, can be acquired at each second control period T2 (0.125 msec), as shown in FIG. 13.

Accordingly, by calculating the second target current io2 by the use of the interpolation processing section (the processing routine of FIG. 12), the variation of the motor current command value can be suppressed, thereby making it possible to reduce the generation of a control sound from the motor 6, as stated above.

In addition, the frequency of unusual noise is changed from 1 kHz to 8 kHz, and the amount of change $\Delta i1$ (step width) also becomes smaller, so the reduction of the unusual noise can be done.

Since the step S201 in FIG. 8 is only added without changing the period of execution of FIG. 7 (1 msec), the unusual noise can be reduced without increasing the calculation load of the CPU 10 to any substantial extent.

While the invention has been described in terms of preferred embodiments, those skilled in the art will recognize that the invention can be practiced with modifications within the spirit and scope of the appended claims.

What is claimed is:

1. An electric power steering control apparatus comprising:
  a steering system including a steering wheel;
  a torque sensor that detects steering torque applied to said steering system as torque information;
  a motor that generates assist torque for said steering system;
  a calculation section that calculates a motor current command value for said motor based on said torque information at each predetermined sampling period; and
  a motor current control section that drives and controls said motor based on said motor current command value;
  wherein said calculation section includes:
  a first target current calculation section that calculates a first target current based on said torque information detected from said torque sensor in a time series manner at a first control period corresponding to said sampling period; and
  a second target current calculation section that calculates a second target current based on said first target current at a second control period that is shorter than said first control period; and
  wherein said motor current control section controls said motor by using said second target current as said motor current command value.

2. The electric power steering control apparatus as set forth in claim 1, wherein said second target current calculation section executes moving average processing.

3. The electric power steering control apparatus as set forth in claim 1, wherein said second target current calculation section executes low-pass filter processing.

4. The electric power steering apparatus as set forth in claim 1, wherein said second target current calculation section executes interpolation processing.

5. The electric power steering apparatus as set forth in claim 1, wherein said second control period is set to a short period enough to shift a control sound of said motor to a high frequency region of 4 kHz or above.

* * * * *